United States Patent
Kennedy

(10) Patent No.: US 7,849,643 B2
(45) Date of Patent: Dec. 14, 2010

(54) STRUCTURAL STEP UNIT WITH RUN PORTION AND RISE PORTION

(75) Inventor: Stephen John Kennedy, Ottawa (CA)

(73) Assignee: Intelligent Engineering (Bahamas) Limited, Nassau (BS)

( * ) Notice: Subject to any disclaimer, the term of this patent is extended or adjusted under 35 U.S.C. 154(b) by 0 days.

(21) Appl. No.: 11/025,689

(22) Filed: Dec. 28, 2004

(65) Prior Publication Data

US 2006/0150540 A1    Jul. 13, 2006

(51) Int. Cl.
*E04F 11/09*    (2006.01)
(52) U.S. Cl. ........................................................ 52/188
(58) Field of Classification Search ................ 52/182, 52/183, 188, 190, 191, 184, 185, 186; 182/93
See application file for complete search history.

(56) References Cited

U.S. PATENT DOCUMENTS 4,899,504 A * 2/1990 Hirschhorn .................. 52/182
5,014,475 A * 5/1991 Anderson, Jr. et al. ........ 52/191
5,778,813 A    7/1998 Kennedy
6,050,208 A    4/2000 Kennedy
6,895,717 B1 * 5/2005 Grinstead ..................... 52/182
2003/0207116 A1 * 11/2003 Franken et al. ............ 428/411.1

FOREIGN PATENT DOCUMENTS

WO    WO-01/32414 A2    5/2001
WO    WO-02/33200 A1    4/2002

* cited by examiner

*Primary Examiner*—Michael Safavi
(74) *Attorney, Agent, or Firm*—Nixon & Vanderhye P.C.

(57) ABSTRACT

A riser is formed by a structural sandwich plate member in the run or tread portion but a simple steel plate in the rise portion. This riser is cheaper and simpler to manufacture than risers in which both the run and tread are formed by structural sandwich plate members.

1 Claim, 2 Drawing Sheets

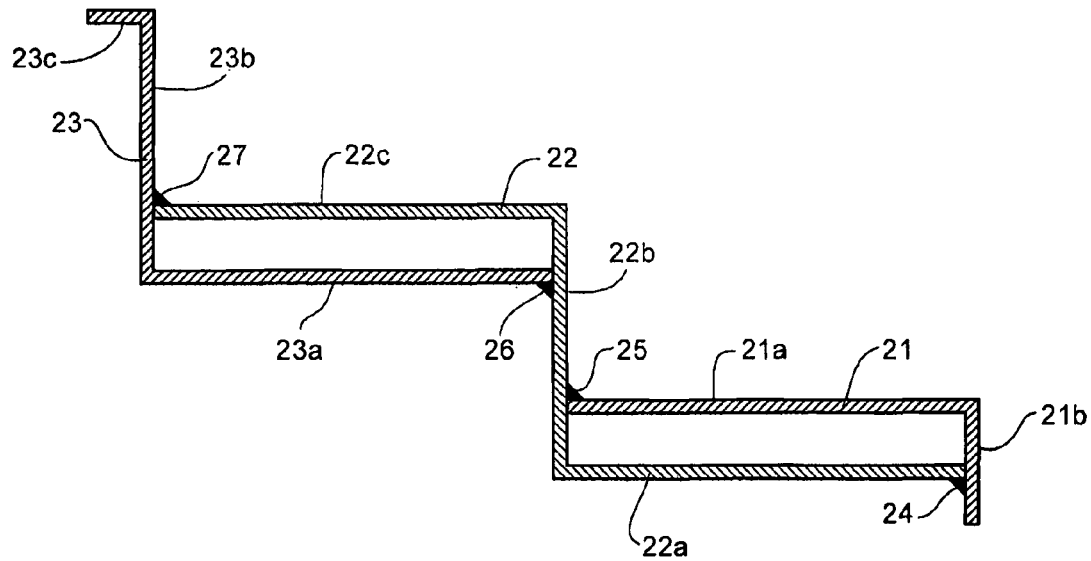
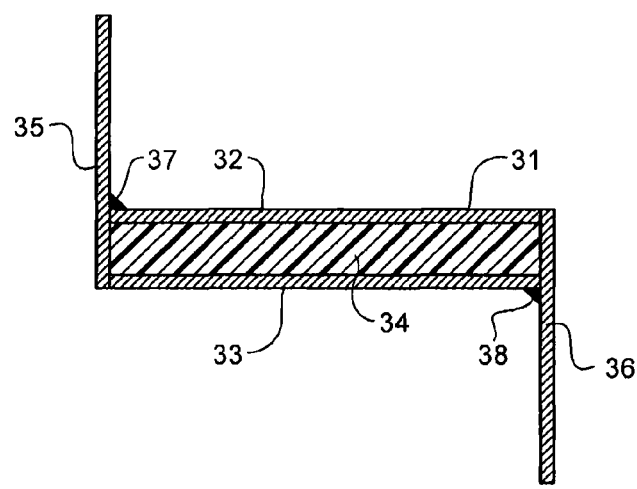
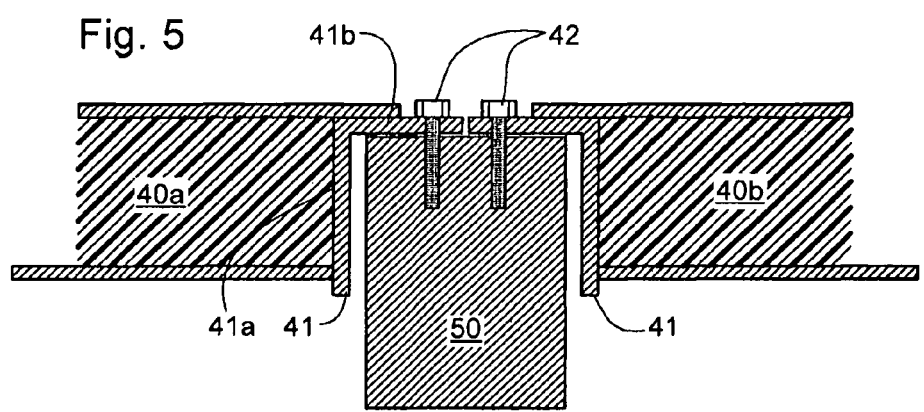

STRUCTURAL STEP UNIT WITH RUN PORTION AND RISE PORTION

FIELD OF THE INVENTION

The present invention relates to risers made from structural sandwich plate members, comprising two outer plates and a core of plastics or polymer material bonded to the outer plates with sufficient strength to substantially contribute to the structural strength of the member.

BACKGROUND OF THE INVENTION

Structural sandwich plate members are described in U.S. Pat. No. 5,778,813 and U.S. Pat. No. 6,050,208, which documents are hereby incorporated by reference, and comprise outer metal, e.g. steel, plates bonded together with an intermediate elastomer core, e.g. of unfoamed polyurethane. These sandwich plate systems may be used in many forms of construction to replace stiffened steel plates, formed steel plates, reinforced concrete or composite steel-concrete structures and greatly simplify the resultant structures, improving strength and structural performance (e.g. stiffness, damping characteristics) while saving weight. Further developments of these structural sandwich plate members are described in WO 01/32414, also incorporated hereby by reference. As described therein, foam forms or inserts may be incorporated in the core layer to reduce weight and transverse metal shear plates may be added to improve stiffness.

According to the teachings of WO 01/32414 the foam forms can be either hollow or solid. Hollow forms generate a greater weight reduction and are therefore advantageous. The forms described in that document are not confined to being made of light weight foam material and can also be make of other materials such as wood or steel boxes, plastic extruded shapes and hollow plastic spheres.

WO 02/33200 discloses a riser, in particular a seating riser for a sports stadium, made of structural sandwich plate. The riser comprises upper and lower metal plates bonded together by a solid elastomer core, which may have different thicknesses in the treads and rises. This riser represents a considerable weight saving as compared to conventional stiffened steel or pre-stressed concrete constructions and the inherent vibration damping characteristics of the sandwich plate are an additional advantage.

SUMMARY OF THE INVENTION

It is an aim of the present invention to provide a structural sandwich plate riser that is simpler and cheaper to manufacture.

According to the present invention, there is provided: a stepped riser comprising a run portion formed by a sandwich structure having first and second metal plates and a core of a plastics or polymer material bonded to said metal plates so as to transfer shear forces therebetween, and a rise portion formed by a third metal plate.

Forming the tread or run of the riser as a structural sandwich plate but the rise as a simple metal plate provides substantially all the advantages of a fully sandwich riser—reduced weight, increased stiffness and noise and vibration damping—but is simpler and even cheaper to manufacture.

The riser can be made as a single step unit or a multiple, e.g. two, step unit.

In one example of a single step unit, the riser is made from two L-shaped sections, a first L-shaped section forms the first and third metal plates whilst the second L-shaped section forms the second metal plate and also closes one side of the cavity in which the core is formed. One of the first and second L-shaped sections is inverted and the free end of the horizontal part of each section is fixed, e.g. by welding, to the vertical part of the other section, near the angle of the L.

In another example of a single step unit said first and second metal plates are generally planar and form a simple sandwich plate member whilst said third metal plate is also generally planar and is welded to the edge of one of said first and second metal plates. A fourth metal plate may be welded to the opposite edge of either one of the first and second metal plates to form a second rise portion.

An example of a two-step riser is formed by an S-shaped section and two L-shaped sections. The first L-shaped section forms a first rise portion and one plate of a first run portion, the S-shaped section forms the other plate of said first run portion, a second rise portion and one plate of a second run portion and the second L-shaped section forms the other plate of the second run portion.

Either or both edges of the riser can be provided with lips for ease of engagement and attachment to adjacent risers.

The riser can be provided with two rise portions, so that two rise portions of adjacent risers abut or overlap in the completed structure, or a single rise portion, in which case the rise portion of one riser is connected to the run portion of an adjacent riser in the completed structure.

The materials, dimensions and general properties of the outer plates of the structural sandwich plate member of the invention may be chosen as desired for the particular use to which the structural sandwich plate member is to be put and in general may be as described in U.S. Pat. No. 5,778,813 and U.S. Pat. No. 6,050,208. Steel or stainless steel is commonly used in thicknesses of 0.5 to 20 mm and aluminium may be used where light weight is desirable. Similarly, the plastics or polymer core is preferably compact (i.e. not foamed) and may be any suitable material, for example an elastomer such as polyurethane, as described in U.S. Pat. No. 5,778,813 and U.S. Pat. No. 6,050,208. Lightweight forms or inserts may also be included as described in WO 01/32414.

BRIEF DESCRIPTION OF THE DRAWINGS

The present invention will be described below with reference to exemplary embodiments and the accompanying schematic drawings, in which:

FIG. 3 is cross-sectional view of a riser according to a second embodiment of the invention;

FIG. 4 is a cross-sectional view of a riser according to a third embodiment of the invention; and FIG. 5 is a cross-sectional view showing a method of attaching risers according to the invention to a raker beam.

In the various drawings, like parts are indicated by like reference numerals.

EMBODIMENTS

Figure 1:
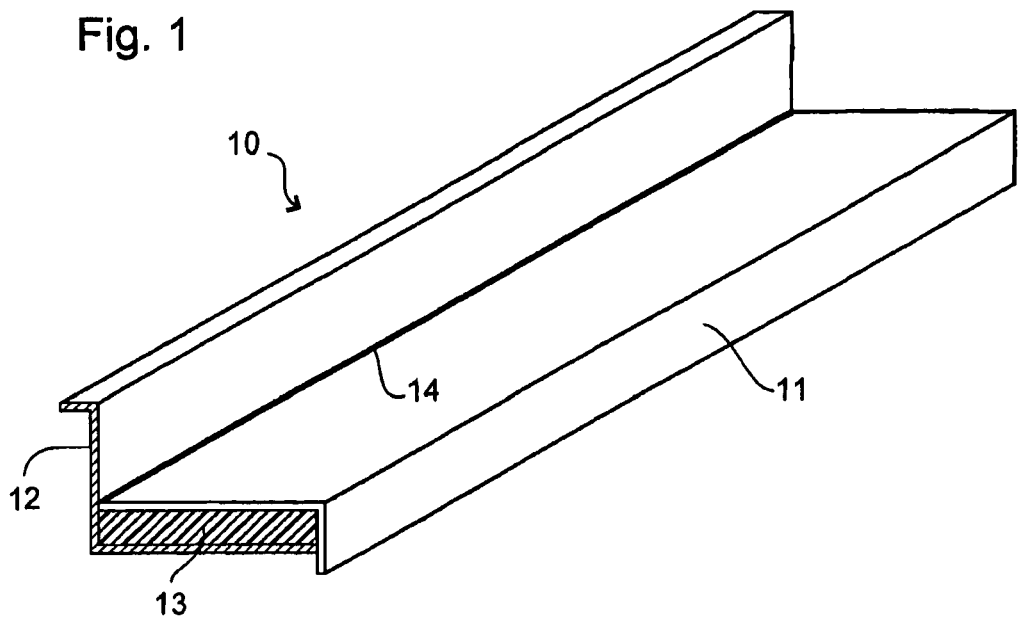
FIG. 1 is a perspective view of a riser according to a first embodiment of the present invention.
Figure 2:
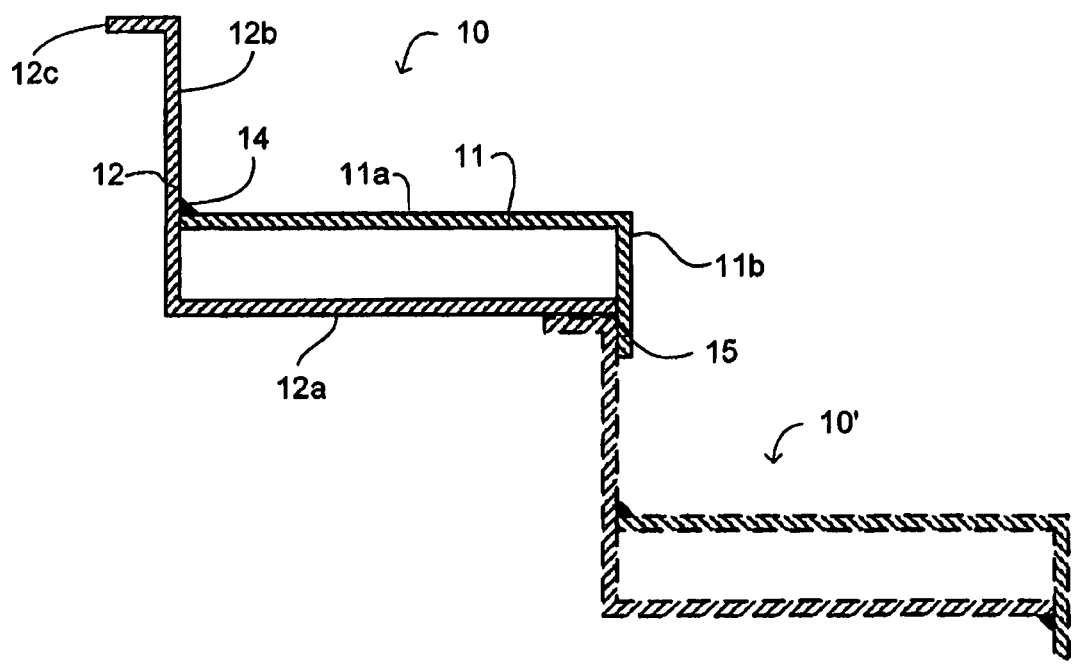
FIG. 2 is an enlarged cross-sectional view of the riser of FIG. 1.

The riser 10 shown in FIGS. 1 and 2 comprises first and second L-sections 11, 12 which may be of steel or aluminium and have a thickness, for example, in the range of from 0.5 to 20 mm. Parts of the riser expected to experience wear in use may be formed with thicker metal layers and/or surface profiling, e.g. to improve grid. L-section 11 is inverted and the free ends of the horizontal portions 11a, 12a of the L-sections 11, 12 are welded to L-section 12 at run welds 14 and 15 to form a cavity. In the cavity between the L-sections 11, 12 is a core 13 of plastics or polymer material, preferably a compact thermosetting material such as polyurethane elastomer, so as to form a structural sandwich plate member which acts as the run or tread of the riser. The free end of L-section 12 extends to form the rise 12b of the riser and may be provided with a lip 12c to assist in location and connection to the adjacent riser 10' in the complete structure. The vertical portion 11b of inverted L-section 11 may extend below the horizontal portion 12a of L-section 12 to form a lip also to assist in location and connection to the adjacent riser 10' in the complete structure.

The core may have a thickness in the range of from 15 to 200 mm and is bonded to the L-sections 11, 12 with sufficient strength and has sufficient mechanical properties to transfer shear forces expected in use between the L-sections. The bond strength between the core 13 and L-sections 11, 12 should be greater than 3 MPa, preferably 6 MPa, and the modulus of elasticity of the core material should be greater than 200 MPa, preferably greater than 250 MPa, especially if expected to be exposed to high temperatures in use. For low load applications, such as staircase risers, where the typical use and occupancy loads are of the order of 1.4 kPa to 7.2 kPa, the bond strength may be lower, e.g. approximately 0.5 MPa. By virtue of the core layer, the structural sandwich plate member has a strength and load bearing capacity of a stiffened steel plate having a substantially greater plate thickness and significant additional stiffening.

To manufacture the structural riser 10, the inner surfaces of L-sections 11, 12 are prepared, e.g. by acid etching and cleaning and/or grit blasting, so that the surfaces are sufficiently clean and smooth to form a good bond to the core material. The L-sections can be formed by roll forming or bending flat plates in well-known processes. The two sections are then welded together and the core cavity closed at its ends, prior to injection of the core material is injected into the core cavity via injection ports (not shown) in either of the L-sections or the perimeter frame. Vent holes can be provided in any convenient position. Both vent holes and injection ports are preferably filled and ground flush after injection is completed. During the injection and curing of the core material, the L-sections may need to be restrained to prevent buckling due to thermal expansion of the core caused by the heat of curing. Alternatively, especially for relatively small riser sections, the L-sections may be put in a mold for injection of the core material.

Although not shown, spacers, lightweight forms, shear plates and other inserts may be positioned in the core cavity before the inverted L-section 11 is fixed in place. Spacers in particular are advantageous to ensure that the spacing of the sections, and hence the core thickness, is uniform across the riser. Detailing, such as seat and safety rail mounts may be welded or otherwise fixed onto the riser as desired before injection or after curing of the core. In the latter case however, care needs to be taken to avoid damage to the core.

A second embodiment of the invention is shown in FIG. 3. In this embodiment, which is generally the same as the first embodiment save as described below, three sections are used to form a two-step riser 20. An S-shaped section 22 forms the lower metal layer 22a of a first tread or run portion, a first rise portion 22b and the upper metal layer of a second tread or run portion 22c. A first L-section 21 is inverted and forms the upper metal layer 21a of the first run portion as well as the edge 21b of that run and a lip to assist in location and attachment of the adjacent riser. A second L-section 23 forms the lower metal layer of the second run portion 23a and a second rise portion 23b. It may also be provided with a lip 23c, again to assist in location and attachment of the adjacent riser.

As with the first embodiment, the L-sections 21, 23 and S-section 22 are welded together at 24, 25, 26 and 27 prior to injection of the core.

A third embodiment of the invention is shown in FIG. 4. In this embodiment, the riser 30 is formed of a "plank" 31 formed as a structural sandwich plate member from upper and lower faceplates 32, 33 and a core 34. The faceplates 32, 33 and core 34 may be of the same materials and dimensions as the bent sections and core of the first and second embodiments. The plank 31 forms the run or tread portion of the riser, to form the rise portion(s) additional metal plates 35, 36 are welded to the faceplates 32,33 of the plank 31. This may be done either before or after injection of the core material, with the proviso that in the latter case care must be taken to ensure that the weld does not damage the core material. The plank may be formed in the desired final dimensions or cut-down from a larger prefabricated structural sandwich plate member. As in the first and second embodiments, fittings may be attached to either the run or rise portions as desired and appropriate surface treatments may also be employed.

FIG. 5 shows a convenient arrangement for attaching risers 40a, 40b according to any of the embodiments of the invention to a raker beam 50. The ends of the risers 40a, 40b are closed by an angle section 41 which has a web part 41a to close the core cavity of the riser and a flange part 41b which is bolted to raker beam 50 by bolts 42.

It will be appreciated that the above description is not intended to be limiting and that other modifications and variations fall within the scope of the present invention, which is defined by the appended claims. For example, the riser may be curved or angled, rather than straight as shown in FIG. 1, as desired for the complete structure in which it is to be used. The riser of the invention may be used in banked seating e.g. in stadiums, as well as staircases and other stepped structures.

I claim:

1. Two interconnected structural elements forming two run portions and two rise portions, each structural element having a single run portion and a single rise portion, and each structural element comprising:

a first L-shaped section roll formed or bent from a metal plate and including first and second sides, a second L-shaped section roll formed or bent from a metal plate and consisting of a horizontal portion and a vertical portion, the second L-shaped section disposed adjacent the first L-shaped section so as to form a sandwich structure including a core of a compact thermosetting polyurethane elastomer material disposed between the first side and the horizontal portion so as to transfer shear forces therebetween, and the vertical portion closing one side of the cavity in which the core is formed, wherein the single run portion is formed by the sandwich structure, and wherein the single rise portion is formed by the second side of the first L-shaped section, and a lip extending from an end of said second side, wherein the lip of a first of the structural elements is in contact with the first side of a second of the structural elements.

\* \* \* \* \*